H. V. McKAY.
THRESHING MACHINE.
APPLICATION FILED DEC. 28, 1916.
1,352,821.
Patented Sept. 14, 1920.
3 SHEETS—SHEET 3.
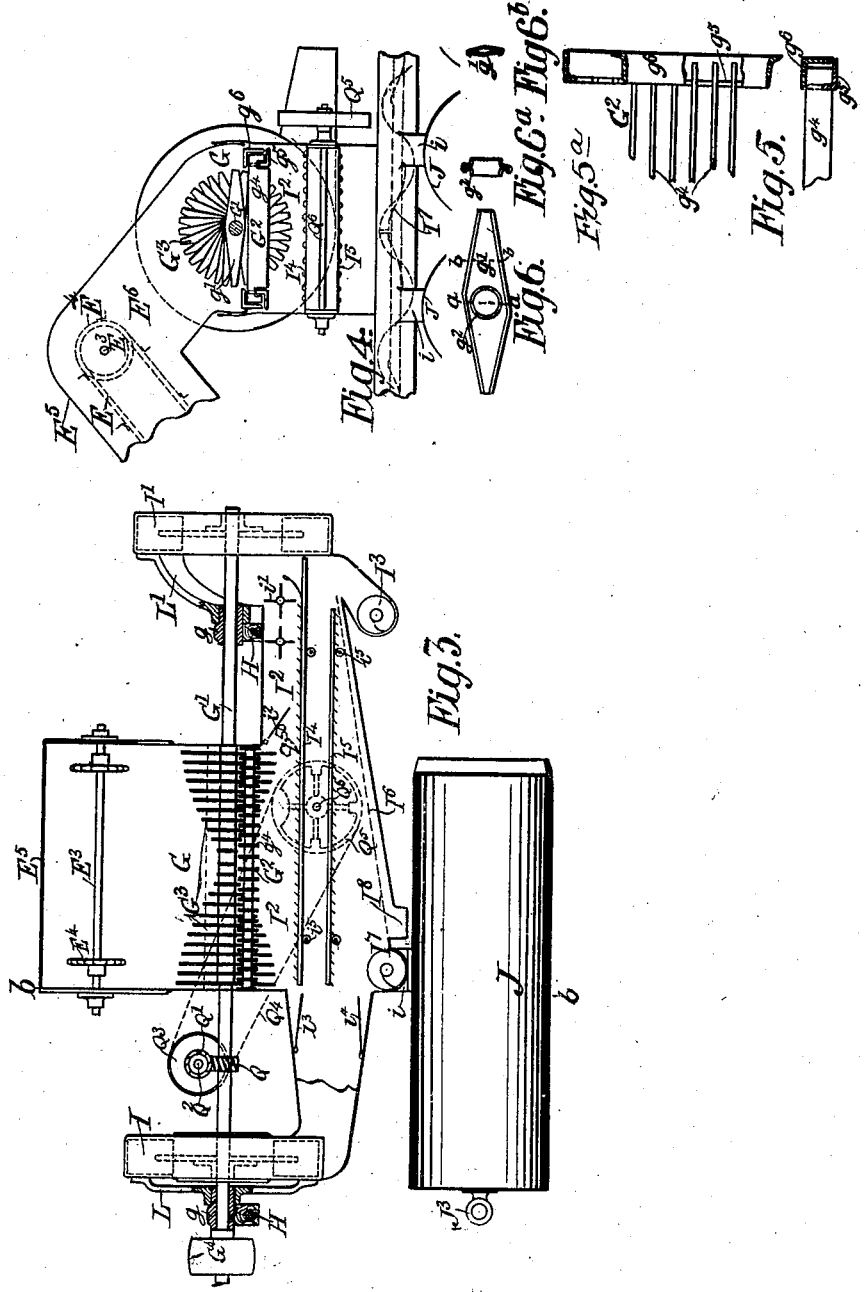
Inventor
Hugh Victor McKay

UNITED STATES PATENT OFFICE.

HUGH VICTOR McKAY, OF SUNSHINE, VICTORIA, AUSTRALIA.

THRESHING-MACHINE.

1,352,821.   Specification of Letters Patent.   Patented Sept. 14, 1920.

Application filed December 28, 1916. Serial No. 139,307.

*To all whom it may concern:*

Be it known that I, HUGH VICTOR MC-KAY, a British subject, residing at Sunshine, in the State of Victoria, Commonwealth of Australia, have invented new and useful Improvements in Threshing - Machines, of which the following is a specification.

This invention of an improved combined harvesting machine has reference to improvements in the construction and arrangement of the operative parts of said machines of the type which cut the heads from standing crop, and then thresh and separate the grain therefrom, while the machine is traveling in the crop, although some of the improvements are applicable to header or reaper combined harvesters. The main feature of this machine relates to the means devised to dispense with the grain elevator usually employed in harvesting machines. The grain collected in this machine is delivered to removable wheat or grain drums or receptacles while the machine is still at work in the field, and when said grain receptacles are filled, they are removed from the machine and replaced by empty ones, and the grain in the filled drums may then be transferred to bags.

The invention or improvements will now be fully described aided by a reference to the accompanying sheets of drawings wherein:—

Figure 1:
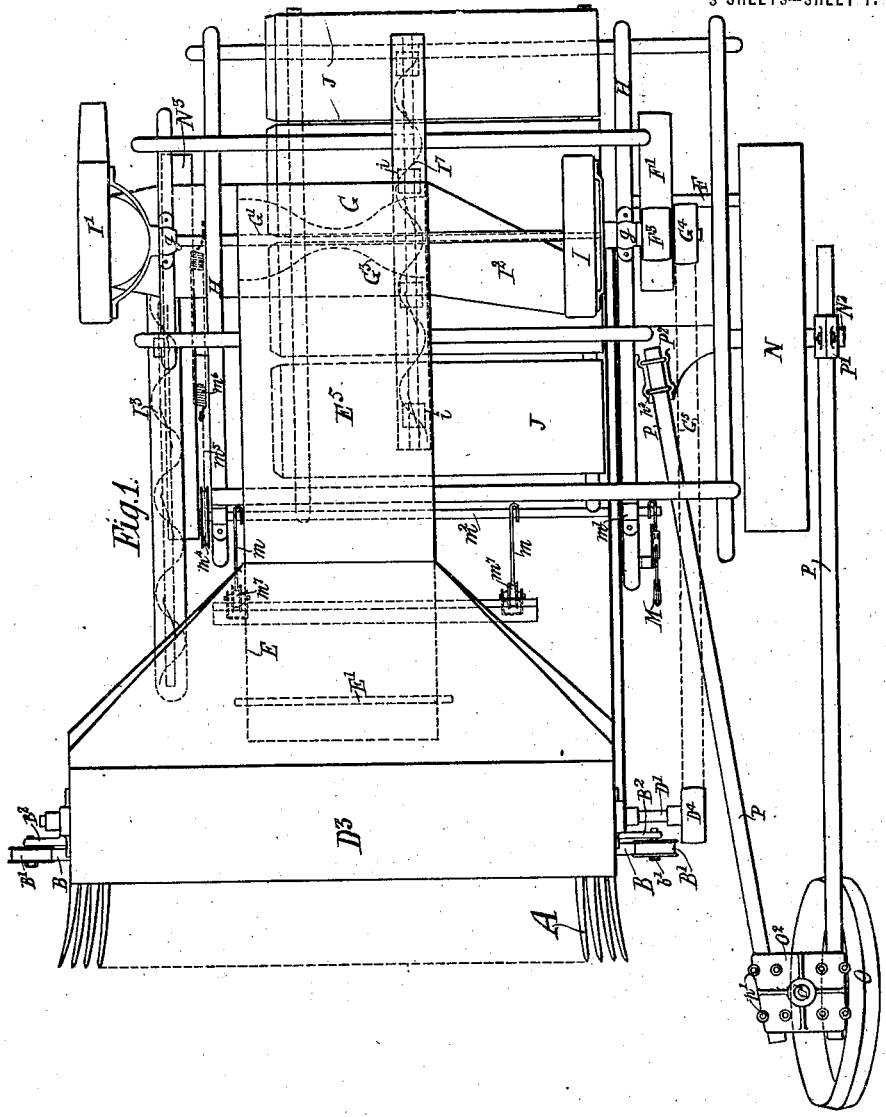

Figure 1 is a plan and

Figure 2:
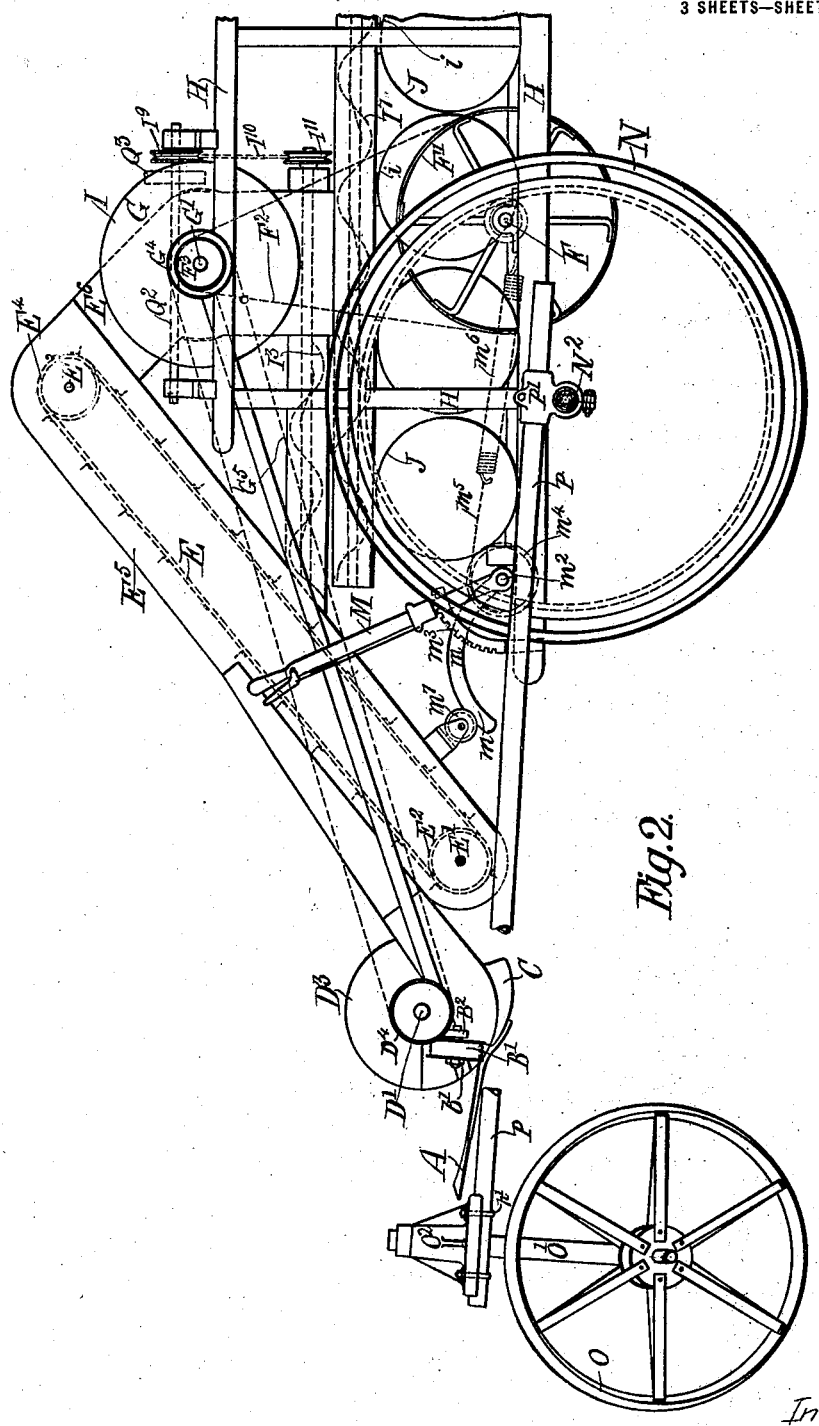

Fig. 2 an elevation of the near side of a combined harvesting machine, showing the means for delivering the grain to grain drums from an Archimedean chute in the riddle box.

Fig. 3 a transverse sectional view showing the peg drum with pressure and exhaust fans on same spindle, the riddles beneath same, the trembler for shaking the riddles and the grain drum, and Fig. 4 is a side sectional view of same, and Fig. 5 side sectional detail and Fig. 5$^a$ part detail plan of the grid of helical beaters.

Figs. 6, 6$^a$ and 6$^b$ side and sectional views of the sheet metal peg drum arms, the sections being taken at $a\ a$ and $b\ b$ respectively of Fig. 6.

The broad uptake elevator E for the cut or stripped heads lies longitudinally about midway of the comb's length and is about one third of its width, while the spindle $E^1$ carrying its lower sprockets or pulleys $E^2$ lies parallel with and behind the beater spindle $D^1$, said spindle $E^1$ being supported in bearings carried on the elevator casing $E^5$, likewise the upper spindle $E^3$ carrying the upper sprockets or pulleys $E^4$ for broad elevator is supported in bearings also carried on the elevator casing, the upper end of the latter being provided with a chute $E^6$ connecting with the peg drum casing G.

The peg drum spindle $G^1$ is supported in bearings $g$ carried by the top bars of body frame H below and behind the top part of broad elevator E and just above the peg drum grid $G^2$, the said spindle $G^1$ besides carrying the peg drum $G^3$ has at its one end an intake or pressure fan I and at other end an exit or exhaust fan $I^1$, to remove by way of a conduit or chamber $I^2$ above the top riddle as much as possible of the straw whiteheads, dust and the like from the grain and deliver the whiteheads to an Archimedean or other conveyer $I^3$ leading to the broad elevator casing $E^5$, while the grain and seconds pass through the top sieve $I^4$ and fall to a lower sieve $I^5$ whereon the grain is winnowed and falls with the small seeds or the like to a still lower inclined screen $I^6$ delivering the grain to an Archimedean conveyer $I^7$ in the riddle box, the grain passing through openings in said conveyer to the grain drums J located directly beneath the conveyer, while the small seeds pass through the lowest screen $I^6$ and are delivered to a chute $I^8$ all as shown in Fig. 3 and said screens $I^4$, and $I^5$ are supported on small rollers $i^5$ attached to cheeks of riddle box. The straw drawn off by the exhaust fan $I^1$ passes through a tubular conduit to a suitable receptacle not shown.

Rotary baffles $i^1$ and hinged baffles $i^2$ are arranged in a chamber above the top sieve $I^4$ the baffles directing the course of the air current and retarding the travel of the heads passing over the upper riddle, while $l^3$ and $l^4$ are upper and lower hinged deflectors for the air fed to riddles from fan I.

The peg drum $G^3$ its spindle and the fans, riddle box and screw conveyers are carried by brackets L and $L^1$ supported by sleeves on bearings $g$ of the peg drum spindle $G^1$ and consequently all swing together about said peg drum spindle.

The arms of peg drum $G^3$ may each be constructed of hollow sheet metal $g^1$ stamped to the proper shape and section and folded together at their edges as shown in Figs. 6, 6ª and 6ᵇ, the interior space being, if desired, filled up with wood or other material, while about their central spindle hole, projecting rims $g^2$ are provided to dispense with loose distance washers usually employed between the beater arms. The bars $g^3$ of the grid $G^2$ may also be made of hollow folded thin sheet metal or alternatively of solid bars $g^4$ (Figs. 5, 6 and 6ª) the end parts of which and their carrying or supporting bars $g^5$ are halved together and secured by cover bars $g^6$ as shown in Figs. 5, 6 and 6ª.

The grid bars when constructed of hollow sheet metal plates $g^3$ may have their sides either plain, corrugated or roughened and in each case, folded or otherwise secured together at their upper and lower edges respectively, while the end parts of each side plate are turned at right angles to form flanges to secure the grid bars by rivets or otherwise to their frame plates. In this case also the hollow space between sheets $d^3$ may be filled in with wood or other suitable substance.

On main spindle F is a pulley $F^1$ communicating motion by belt $F^2$ to a small pulley $F^3$ on peg drum spindle, while another pulley $G^4$ on the latter spindle communicates motion by belt $G^5$ to a pulley $D^4$ on beater spindle $D^1$.

Q is a worm wheel on peg drum spindle $G^1$ imparting motion to a worm $Q^1$ on a lay spindle $Q^2$ upon which is a belt pulley $Q^3$ communicating motion by belt $Q^4$ with a pulley $Q^5$ on a spindle $Q^6$ carried by the riddle box, such pulley $Q^5$ being weighted as at $q^5$, as shown in Fig. 3, so as to give a trembling or shaking motion to the sieves $I^4$ and $I^5$.

$I^9$ is a sheave on spindle $Q^2$ imparting motion by belt $I^{10}$ to a sheave $I^{11}$ on the spindle of Archimedean conveyer $I^3$, while the grain conveyer $I^7$ may be similarly driven from any suitable spindle of the machine.

Having now described my invention what I claim as new and desire to secure by Letters Patent is:—

1. In a threshing machine, a spindle, a peg drum on the spindle, an intake fan at one end of the spindle, an exhaust fan at the other end of the spindle, and baffles below said spindle and coacting with said peg drum.

2. In a threshing machine, a riddle box, vibrating sieves in said box, an exhaust fan arranged at one end of the box and an intake fan arranged at the opposite end of the box, a peg drum above and communicating with said box, and baffles coöperating with said drum.

3. The combination with a threshing machine, of screening mechanism, comprising a riddle box, grain drums, and means for conveying the grain from said box to said drums.

4. The combination with a threshing machine, of screening mechanism, comprising a plurality of movable sieves, means for supporting the same and means for vibrating said sieves, comprising a shaft and a wheel fixed to said shaft mounted for rotation in the sieve-supporting means and weighted at one point to unbalance the same, and means for rotating said shaft.

5. The combination with a threshing machine, of horizontally disposed conveying means, a frame, a plurality of receptacles supported on said frame, and means formed in said conveying means and said receptacle for conveying the grain from the conveying means to the receptacle.

6. In a threshing machine, a riddle box, an intake fan at one end of the box, an exhaust fan at the other end of the box, a shaft supporting said fans, a peg drum fixed to said shaft and interposed between said fans, a grid baffle coöperating with said peg drum, vibrating sieves within said riddle box, an inclined screen below said sieves, and conveying means at the opposite ends of said screen.

7. The combination with a traveling harvester, of threshing and screening mechanism, comprising a peg drum secured to a spindle mounted for rotation on the frame of the harvester, an elevator, a chute communicating with said elevator and peg drum an air pressure fan at one end of said spindle and an exhaust fan at the opposite end thereof, a riddle box disposed below the peg drum and provided with shakable screens, said riddle box having a passage formed in its bottom, an Archimedean screw conveyer operating within said opening, and a series of drums located in position to receive grain from said conveyer.

In testimony whereof I have signed my name to this specification in the presence of two subscribing witnesses.

HUGH VICTOR McKAY.

Witnesses:
BEDLINGTON KODGCOMB,
LESLIE LAWTON BEAR.